(12) United States Patent
Hain et al.

(10) Patent No.: US 9,625,896 B2
(45) Date of Patent: Apr. 18, 2017

(54) BOLT JOINING METHOD AND TOOLS THEREFOR

(71) Applicant: NEWFREY LLC, Newark, DE (US)

(72) Inventors: Jochen Hain, Giessen (DE); Frank Schmidt, Giessen (DE)

(73) Assignee: NEWFREY LLC, New Britain, CT (US)

(*) Notice: Subject to any disclaimer, the term of this patent is extended or adjusted under 35 U.S.C. 154(b) by 701 days.

(21) Appl. No.: 14/039,284

(22) Filed: Sep. 27, 2013

(65) Prior Publication Data

US 2014/0025196 A1   Jan. 23, 2014

Related U.S. Application Data

(63) Continuation of application No. PCT/EP2012/050587, filed on Jan. 17, 2012.

(30) Foreign Application Priority Data

Mar. 29, 2011 (DE) .................. 10 2011 016 132

(51) Int. Cl.
| | | |
|---|---|---|
| *G06F 19/00* | (2011.01) | |
| *G05B 19/402* | (2006.01) | |
| *B23K 9/20* | (2006.01) | |
| *B23K 11/00* | (2006.01) | |
| *B23K 37/02* | (2006.01) | |
| *B23K 37/04* | (2006.01) | |

(52) U.S. Cl.
CPC ............ *G05B 19/402* (2013.01); *B23K 9/202* (2013.01); *B23K 11/0053* (2013.01); *B23K 37/0217* (2013.01); *B23K 37/0426* (2013.01)

(58) Field of Classification Search
CPC .. G05B 19/402; B23K 37/0217; B23K 9/202; B23K 11/0053; B23K 37/0426
USPC .......................................... 700/114, 116, 179
See application file for complete search history.

(56) References Cited

U.S. PATENT DOCUMENTS

| | | | | |
|---|---|---|---|---|
| 7,256,697 | B2* | 8/2007 | Sakama | G06K 19/04 340/572.1 |
| 8,584,957 | B2* | 11/2013 | Zhu | G06K 19/07779 235/375 |
| 8,683,869 | B2* | 4/2014 | Herley | G01L 5/246 73/760 |

(Continued)

FOREIGN PATENT DOCUMENTS

| | | |
|---|---|---|
| CH | 688034 A | 4/1997 |
| CN | 101801115 A | 8/2010 |

(Continued)

*Primary Examiner* — Ronald Hartman, Jr.
(74) *Attorney, Agent, or Firm* — Michael P. Leary

(57) ABSTRACT

A method for carrying out a stud joining process by a tool performing a working step on a workpiece and the working step is carried out while taking into account at least one parameter value which is selected from a set of values, and the working step is to be carried out at a certain position on the workpiece, and the position determines the parameter value. The method comprises the steps of: storing the parameter value for the position in an RFID transponder; locating the RFID transponder on the workpiece in the region of the position before the working step is carried out, reading the parameter value out from the RFID transponder with an RFID communication device associated with the tool.

10 Claims, 3 Drawing Sheets

(56) References Cited

U.S. PATENT DOCUMENTS

| | | | |
|---|---|---|---|
| 9,091,291 B2* | 7/2015 | Andrade de Souza | F16B 31/021 |
| 9,339,926 B2* | 5/2016 | Kibblewhite | B25B 21/002 |
| 2003/0105599 A1* | 6/2003 | Fisher | B23P 19/066 |
| | | | 702/41 |
| 2008/0115636 A1* | 5/2008 | DeRose | B25B 23/1425 |
| | | | 81/479 |
| 2008/0281332 A1* | 11/2008 | Taylor | A61B 17/1626 |
| | | | 606/104 |
| 2010/0140345 A1* | 6/2010 | Sakamoto | B25B 21/00 |
| | | | 235/376 |
| 2011/0273296 A1* | 11/2011 | Laase | G06Q 10/00 |
| | | | 340/572.1 |
| 2013/0047408 A1* | 2/2013 | Kibblewhite | B25B 21/002 |
| | | | 29/525.01 |
| 2013/0186951 A1* | 7/2013 | Zhu | G06K 19/07779 |
| | | | 235/375 |
| 2014/0345110 A1* | 11/2014 | Schmidt | F16B 13/004 |
| | | | 29/450 |
| 2016/0113681 A1* | 4/2016 | Singh | A61B 19/56 |
| | | | 606/102 |

FOREIGN PATENT DOCUMENTS

| | | | | |
|---|---|---|---|---|
| DE | 2007301598 A | | 11/2007 | |
| DE | 202009012370 U | | 11/2009 | |
| DE | 102008049816 A | | 4/2010 | |
| JP | 3264282 A | | 11/1991 | |
| JP | 2006-185314 | * | 7/2006 | ........... G05B 19/418 |
| JP | 2007-087249 | * | 4/2007 | ........... G05B 19/418 |

* cited by examiner

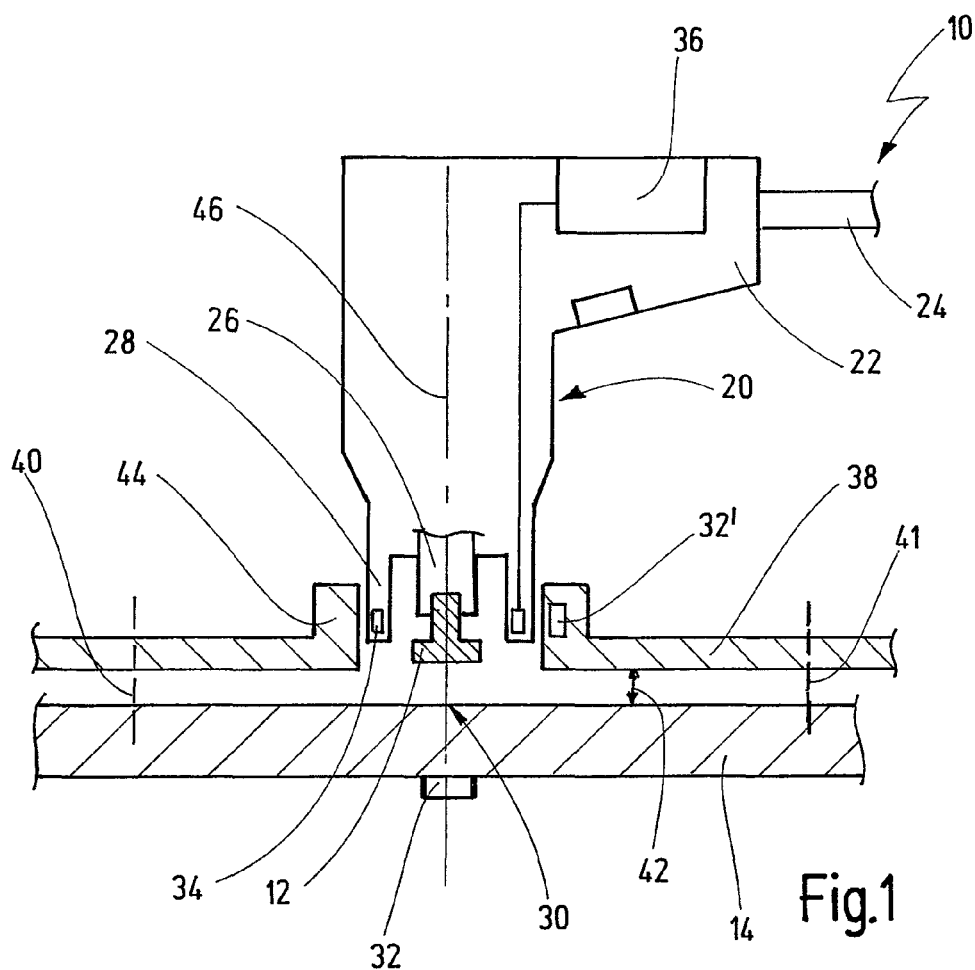
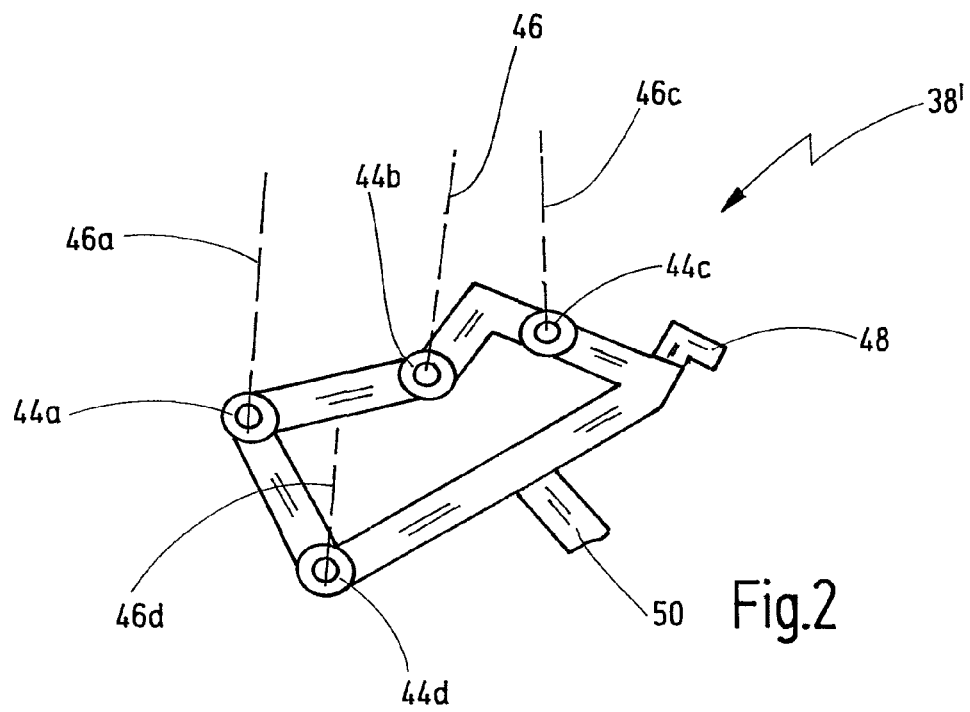
Fig.1
Fig.2

BOLT JOINING METHOD AND TOOLS THEREFOR

CROSS-REFERENCE TO RELATED APPLICATIONS

This application is a continuation of PCT Application No. PCT/EP2012/050587, filed on Jan. 17, 2012 which claims priority from German Patent Application No. DE 102011016132.5, filed on Mar. 29, 2011, the disclosure of which is incorporated herein by reference.

BACKGROUND OF THE INVENTION

The present invention relates to a workpiece processing method for carrying out a working step on a workpiece by means of a tool, in particular for carrying out a stud joining process, wherein the working step is carried out while taking into account at least one parameter value which is selected from a set of values, and wherein the working step is to be carried out at a certain position on the workpiece, said position determining the parameter value.

Furthermore, the present invention relates to a tool for carrying out such a method, in particular a stud joining tool, and to a positioning device for carrying out this method.

In workpiece processing methods of the type described above, working steps of the same type can be carried out in succession by means of the tool, for example successive stud joining processes. On account of the boundary conditions, however, it may be necessary to set the tool and/or other parameters differently for each of these processes. In stud joining processes, for example, the stud materials and/or the workpiece materials or workpiece thicknesses can vary from process to process. As a rule, this is taken into account by other joining parameters being preselected, depending on process or position. These joining parameters (for example welding voltage or current, frequency, joining stroke, joining time, etc.) are as a rule stored beforehand in a control device for each process or for each type of process. Before each joining operation, the respective joining parameters are then selected manually according to the position and the process thus to be carried out. This applies in particular to the case where the joining tool is a hand-operated joining tool, for example a joining gun.

Errors can occur during the manual selection, and therefore the incorrect joining parameters are selected for the respective joining process. This may lead to the joint not having the adequate strength, to the workpiece being damaged, etc.

Document DE 20 2009 012 370 U1 discloses a welding apparatus in which a hand unit has at least one signal means for optically displaying operating information of the welding apparatus. This is intended to make it possible to render information about the operating state of the welding apparatus discernible for the user at any time.

BRIEF SUMMARY OF THE INVENTION

Against this background, one object of the invention is to specify an improved workpiece processing method and improved tools for this purpose.

This object is achieved firstly by a workpiece processing method for carrying out a working step on a workpiece by means of a tool, in particular for carrying out a stud joining process, wherein the working step is carried out while taking into account at least one parameter value which is selected from a set of values, and wherein the working step is to be carried out at a certain position on the workpiece, said position determining the parameter value, wherein an RFID transponder has been arranged in the region of the position before the working step is carried out, in which RFID transponder the parameter value for this position is stored, and wherein the tool has an RFID communication device, by means of which the parameter value is read out from the RFID transponder.

Furthermore, the above object is achieved by a tool which is suitable for carrying out this method, in particular in the form of a stud joining tool, wherein the tool has an RFID communication device for reading out a parameter value from an RFID transponder and/or for writing a parameter value into the RFID transponder.

Furthermore, the above object is achieved by a positioning device for carrying out the method, wherein the positioning device has a plurality of positioners for defining a plurality of positions on a workpiece and wherein an RFID transponder is secured to at least one of the positioners.

Finally, the above object is achieved by the use of RFID identification for determining a parameter value, with reference to which a working step is carried out on a workpiece by means of a tool, in particular with a method of the above-mentioned type.

As a result of the measure of arranging an RFID transponder in the region of the position of the operating step to be carried out, in which RFID transponder the parameter value or a number of a set of joining parameters or the like for this position is stored, this parameter value can be read out by means of the RFID communication device when the tool is placed in the region of the position. As a result, it is possible to automatically set the tool or other devices with reference to the parameter value, such that a manual selection of the parameter value is dispensed with. This can ensure that the correct parameter value can be used for the respective working step to be carried out. Incorrect working steps on account of the selection of an incorrect parameter value can be avoided in this way.

The expression "parameter value" should in this case be understood in general terms. This can be a number of a program, by means of which, for example, the tool is programmed. Since a plurality of parameters for the respective working step are to be set as a rule, it is preferred if the parameter value is an individual numerical value which refers to such a set of working step parameters. In general, however, it is also conceivable for the parameters to be stored directly in the RFID transponder.

In the simplest case, the RFID communication device can be a reader device which is designed to read out a parameter value from the RFID transponder. Alternatively or additionally, however, the RFID communication device can be designed to write a parameter value into the RFID transponder.

The processing method is preferably a stud joining process, such as a stud welding process or a stud adhesive-bonding process, in which a stud or another part is joined to a workpiece along a joining axis from one side. In a stud joining process, stud and workpiece are generally made of a metallic material. In a stud adhesive-bonding process, both stud and workpiece can also be made of other materials, such as, for example, plastic, etc.

In a stud welding process, the welding parameters for carrying out this process are, for example, the welding current, the welding stroke, the welding time, etc.

Although the present method is preferably used in the field of stud joining processes, the method can also be used, for example, in drilling processes or screwing processes.

Here, the working step parameters can be, for example, the rotational speed, clockwise/anticlockwise rotation, feed, torque, angle of rotation, etc. Furthermore, a drilling parameter can be, for example, whether a drilling coolant is fed or not.

In the simplest case, the parameter value can also be a position recognition value. In this case, the method according to the invention can also be used for locating the respective position without different process parameters being set in the tool from process to process. In this type of method, the coupling between the transponder and the reader device is used in order to determine the position at which the working step or process is to be carried out.

The expression "RFID" is in this case to be understood in very general terms. The expression "RFID identification" refers both to RFID techniques in which the coupling between transponder and reader device is effected inductively and to those techniques in which the coupling is effected electromagnetically (by radio). It is preferred if the RFID transponder is a passive transponder, which has no independent energy supply. In this case, the transponder can have, for example, a chip in which there is an electronic memory for storing a parameter value. Furthermore, such a passive transponder can have a coil, via which energy is fed in by means of the reader unit in order to cause the chip to transmit the parameter value. This method is used in particular in an inductive coupling. The coil serves in this case as a type of aerial, via which a communication with an RFID communication device can be set up. In an active transponder, an aerial of another type can be used as communication means.

In general, however, the RFID transponder can also be a simple tag which can be read by means of a reader device. The RFID transponder could in this case be a barcode, and the RFID communication device could in this case be a barcode scanner.

The object is therefore completely achieved.

It is especially preferred if the RFID transponder, for carrying out the working step, is arranged temporarily on the workpiece.

As a result of this measure, it is possible to further process or deliver the processed workpiece without an RFID transponder arranged thereon.

The temporary attachment can be effected, for example, via an adhesive.

In a stud joining process, the transponder can be attached in the region next to a joining position on the surface of the workpiece, or also on the rear side thereof.

However, it is especially preferred if the RFID transponder is secured to a holding device which is attached to the workpiece before carrying out the working step.

Such a holding device can also easily be removed again after the working step has been carried out. For example, the holding device can be temporarily connected to the workpiece, using conventional fastening means such as clamps, screws, etc.

It is especially advantageous in this case if the holding device is designed as a positioning device which defines the position of the working step.

In this embodiment, the holding device serves as a type of template in order to mechanically define the position of the working step.

The positioning device can in this case have a positioner which is designed, for example, as a guide bushing. A mouthpiece or another head part of a joining tool can be inserted into such a bushing. In this case, the positioning device is secured to the workpiece in such a way that the positioner or the guide bushing lies exactly over the position. Here, the RFID transponder can be integrated, for example, into the bushing.

Such a positioning device is used, for example, for carrying out stud joining processes in the prototype construction of motor vehicles, partly also in series production and at repair and rework stations. In this case, the template is secured to the workpiece (vehicle body).

It is preferred in this case if the positioning device has a plurality of positioners for defining a plurality of positions on the workpiece, wherein an RFID transponder is secured to at least one of the positioners.

Positioning devices of this type have, for example, a plurality of positioners in the form of bushings in order to define different joining positions on the workpiece. In the different joining positions, the joining parameters may be different, and so the securing of an RFID transponder to one or more of the positioners can serve to automatically set the joining parameters by means of the method according to the invention.

On the whole, therefore, it is preferred if the read-out parameter value is transmitted to a control device which sets the tool on the basis of the parameter value.

As a result of this measure, it is possible to automatically set the tool for the respective working step to be carried out as soon as the tool has been arranged in the region of the position and the RFID transponder arranged in this region has been read out. Incorrect settings of the tool when carrying out the working step can be avoided in the process.

Furthermore, it is possible to count in the control device the number of working steps to be carried out. For example, if a plurality of working steps are to be carried out one after the other, an internal counter of the control device can be incremented at the same time during the reading-out of each RFID transponder. This enables monitoring to be carried out to determine whether a working step has also actually been carried out at each position or whether possibly a working step has been forgotten at one of the positions.

Furthermore, it is preferred on the whole if the RFID transponder has a coil which is arranged concentrically around a processing axis.

In this embodiment, it is possible to arrange the tool in any desired rotary position with respect to the processing axis, and therefore an exact rotary orientation of the tool at the position is not necessary.

Furthermore, it is preferred in the tool according to the invention if the RFID communication device is mounted on the tool so as to be movable in a direction parallel to a processing axis. In particular, it is preferred if the RFID communication device is mounted so as to be movable in this direction relative to a mouthpiece and/or relative to a holding device for a component to be joined.

This is in particular advantageous if the tool is provided for carrying out working steps during which an RFID transponder is secured to a holding device. It may be the case here that the holding device or the RFID transponder is arranged at a different height with respect to the workpiece from working step to working step. The mobility of the RFID communication device can ensure that said RFID communication device can always be positioned optimally with respect to the RFID transponder, in particular as close to the RFID transponder as possible, irrespective of the relative position of the RFID transponder with respect to the workpiece.

It is especially preferred in this case if the RFID communication device is elastically preloaded in a basic position, for example by means of a spring device. This can ensure that the RFID communication device as far as possible always bears against an intended bearing surface of the holding device and/or of the RFID transponder.

According to a further preferred embodiment of the tool according to the invention, the RFID communication device has a coil or aerial which is arranged concentrically about a processing axis in such a way that a communication with the RFID transponder can be effected substantially independently of a rotary position of the tool about the processing axis.

This embodiment is in particular preferred when the RFID transponder also has a coil which is arranged concentrically to the processing axis. In this case, it is especially preferred if the coils are matched to one another in their arrangement and size in such a way that said coils are substantially in alignment with one another in a direction parallel to the processing axis. As a result, the communication reliability can be markedly increased.

In the positioning device according to the invention, it is preferred if at least one of the positioners is designed as a bushing.

Furthermore, it is preferred in this case if the bushing has an outer sleeve and an inner ring connected thereto, wherein the RFID transponder is integrated into the inner ring. The outer sleeve of the bushing is preferably made of a metallic material and can therefore be secured to the positioning device (template) by conventional joining methods. The inner ring preferably has a non-conductive and non-magnetic material, such as, for example, plastic or synthetic resin. Owing to the fact that the outer sleeve surrounds the inner ring, interference between bushings adjacent to the transponder can be avoided. Furthermore, the outer sleeve can remain on the template, even if the RFID transponder is exchanged.

It goes without saying that the abovementioned features and the features still to be explained below can be used not only in the respectively specified combination but rather also in other combinations or on their own without departing from the scope of the present invention.

BRIEF DESCRIPTION OF THE SEVERAL VIEWS OF THE DRAWING

Exemplary embodiments of the invention are shown in the drawing and are described in more detail below. In the drawing:

FIG. 1 shows a schematic cross-sectional view of a joining arrangement having a stud joining tool according to an embodiment of the present invention;

FIG. 2 shows a schematic illustration of a positioning device;

DETAILED DESCRIPTION OF THE PREFERRED EMBODIMENTS

Figure 3:
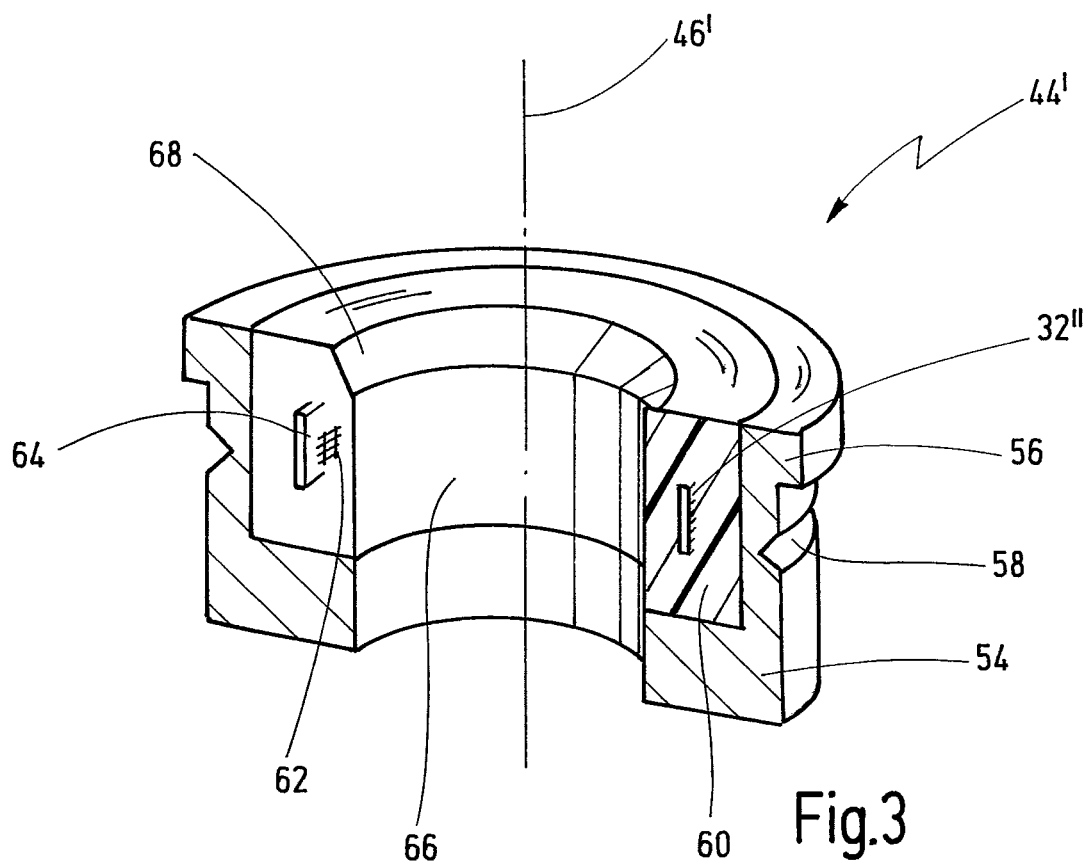
FIG. 3 shows a perspective sectional view of a bushing for a positioning device of the type shown in FIG. 2.

A joining arrangement in the form of a stud welding arrangement is designated generally by 10 in FIG. 1. The joining arrangement 10 serves to join a stud 12 to a workpiece 14 in the form of a sheet or the like in one working step. The joining operation is effected in this case preferably in such a way that an integral connection, such as a welded or adhesively bonded connection, is set up between the stud 12 and the workpiece 14. The joining operation is carried out only from one side of the workpiece 14.

The joining arrangement 10 has a joining tool 20 in the form of a stud welding gun. The joining tool 20 has a handle 22 and is connected via a schematically indicated supply line 24 to a power source and possibly to a control device.

In the region of a head, the joining tool 20 has a holding device 26 for holding a stud 12. The holding device 26 is surrounded by a mouthpiece 28, which can be connected, for example, rigidly to the housing of the joining tool 20. The holding device 26 can be displaceable in the axial direction relative to the housing. Furthermore, the holding device 26 is preferably driven in the axial direction by means of a mechanical or electromechanical device.

To carry out a stud welding operation, as a rule the stud 12 is first of all put onto the workpiece 14 and then the mouthpiece 28 comes down on the workpiece 14. A pilot current, which flows via the workpiece 14 and the stud 12, is then switched on. Subsequently, the stud 12 is lifted from the workpiece 14, such that an arc is produced between the stud 12 and the workpiece 14. The current is then increased to a welding current, such that those surfaces of stud 12 and workpiece 14 which are opposite one another are fused. In a last step, the stud 12 is lowered again onto the workpiece 14, such that the molten pools intermix and the arc is short-circuited. The welding current is switched off. The complete molten pool solidifies, such that the stud 12 is integrally connected to the workpiece 14. In a stud adhesive-bonding process, it is normal practice to heat a layer of adhesive on that side of the stud 12 which faces the workpiece 14 before the stud 12 is lowered onto the workpiece 14.

To carry out such a joining process, the joining tool 20 is positioned with respect to an intended position 30 at the workpiece 14.

To carry out a plurality of such joining processes one after the other, during which different studs 12 are joined one after the other to the same workpiece 14 or different workpieces 14, it may be necessary to set the respective joining parameters differently for the individual processes. As a rule, the joining parameters are stored for the individual welding processes in a control device which is connected to the joining tool 20.

In order to be able to select the suitable set of joining parameters automatically, an RFID transponder 32 has been arranged in the region of the position 30. In the illustration of FIG. 1, the transponder 32 is arranged on that side of the workpiece 14 which is opposite the joining location. As a rule, this embodiment is only relevant when the workpiece 14 is not made of a metallic material. As an alternative, the transponder 32 can also be arranged next to the position 30 or the joining location on the top side of the workpiece 14. The transponder 32 is in this case preferably arranged temporarily, such that the workpiece 14 can then be further processed or delivered without the transponder 32. Stored in the RFID transponder 32 is a parameter value which is selected from a range of values and contains the joining parameters or a reference to the joining parameters in the control device which are to be set for the joining process to be carried out at this position 30.

An RFID communication device 34 is provided on the joining tool 20. As shown in FIG. 1, the RFID communication device 34 is preferably arranged in the region of the mouthpiece 28 of the joining tool 20. The RFID communication device 34 is connected to a control device 36 of the joining tool 20. Alternatively, the RFID communication device 34 can be connected to a control device which is connected to the tool 20 via the supply line 24.

When the mouthpiece 28 is put onto the workpiece 14, before the joining process is actually carried out, the RFID communication device 34 reads the parameter value from the transponder 32 and transmits this parameter value to the control device 36. With reference to the parameter value, the control device 36 selects the joining parameters relevant to this position and accordingly sets the joining tool 20. Furthermore, an energy supply source can also be set with reference to this parameter value, said energy supply source being connected to the joining tool 20 via the supply line 24. Finally, the type of stud 12 which is to be joined in the working step and is possibly fed automatically to the tool 20 can be alternatively or additionally selected via the parameter value.

The joining process is then carried out with reference to the joining parameters selected automatically in this way. Manual selection errors of incorrect joining parameters can be avoided as a result.

For the correct positioning of the joining tool 20 with respect to the joining position 30, it is known to mount a positioning device 38 at the workpiece 14 beforehand. The positioning device 38 is attached to the workpiece 14 at schematically indicated attachment points 40, 41, for example in the form of screwed connections or by clamping connections or the like. The connection should at any rate also be easily releasable again, since the positioning device 38 is secured only temporarily to the workpiece 14.

Furthermore, the positioning device 38 is preferably mounted at a distance 42 from the surface of the workpiece 14.

The positioning device 38 has a positioner in the form of a bushing 44. The bushing 44 defines a joining axis 46 which, when the positioning device 38 is attached, is disposed exactly and perpendicularly at the position 30 on the surface of the workpiece 14.

To carry out the joining process, the mouthpiece 28 is inserted into the bushing 44 and then put onto the top side of the workpiece 14. As a result, it can be ensured that the stud 12 is joined to the workpiece 14 at the correct position 30.

When such a positioning device 38 is used, it is preferred to secure the RFID transponder 32 to the positioning device 38. It is especially preferred to secure a transponder to the positioning device 38 in the region of the bushing 44, as schematically shown in FIG. 1 at 32'. In this case, on account of the close proximity between the mouthpiece 28 and the bushing 44 during the joining process, reliable recognition and reading-out of the transponder 32 by means of the RFID communication device 34 can be ensured.

Shown in FIG. 2 is a further embodiment of a positioning device 38'. The positioning device 38' has a plurality of bushings 44a, 44b, 44c, 44d which are rigidly connected to one another by struts. Furthermore, the positioning device 38' has a plurality of stirrups or clamping devices 48, 50 for securing the positioning device 38' to the workpiece 14.

The bushings 44a-44d define respective joining axes 46a-46d, which define a plurality of different positions 30 on the workpiece 14.

Although not shown in FIG. 2 for reasons of clarity, a transponder 32 is preferably arranged on at least one of the bushings 44a-44d, as shown at 32' in FIG. 1. Such a transponder 32' is preferably arranged on each bushing 44a-44d. The transponders 32' of the bushings 44a-44d define, via the parameter value stored therein, in each case the joining parameter or the set of joining parameters which are to be used when carrying out the joining processes in the region of the respective bushings 44a-44d.

FIG. 3 shows a preferred embodiment of a bushing 44', as can be used, for example, in the positioning device 38' for each of the bushings 44a-44d.

The bushing 44' of FIG. 3 has an outer sleeve 54 made of a metallic material. The outer sleeve 54 has a shoulder 56 at a first longitudinal end, such that the outer sleeve 54 can be inserted into a preformed bore in a positioning device 38. Furthermore, a notch 58 for fixing the bushing 44 to a positioning device is formed on the outer circumference of the outer sleeve 54.

Furthermore, the bushing 44' has an inner ring 60. The inner ring 60 is preferably made of a non-metallic and non-magnetic material, such as, for example, plastic or synthetic resin. For example, the inner ring 60 can be formed by casting a synthetic resin compound.

A top side of the inner ring 60 is flush with the top side of the outer sleeve 54. An underside of the inner ring 60 is in alignment with a radially inwardly projecting section of the outer sleeve 54. An inside diameter of the radially projecting section of the outer sleeve 54 and an inside diameter of the inner ring 60 are coaxial to one another and jointly form a bore 66.

Integrated into the inner ring 60 is an electronic component in the form of a transponder chip 62, which has a memory for storing the parameter value. In general, each transponder chip 62 has a unique ID worldwide, which can represent a reference to a parameter value. Furthermore, the chip 62 is connected to a coil 64 which forms an "aerial" of the transponder 32". The transponder 32" is preferably a passive transponder and does not have an independent energy supply source. The read-out operation is effected by the RFID communication device 34 supplying energy to the chip 62 by an inductive coupling with the coil 64, said chip 62 reading out the memory by means of this energy and "transmitting" in turn the parameter value stored therein via an inductive coupling between the coil 64 and the RFID communication device 34. As a result, the transponder 32" can be read out. The transponder 32 can also be of the active type, which is fed from a battery.

The coil 64 is preferably formed concentrically to the inner ring 60 and is jointly integrated with the chip 62 connected thereto into the inner ring 60, preferably cast therein. As a result of the concentric arrangement of the coil 64, it is possible to set up a communication with an RFID communication device which is substantially independent of a relative rotary position of the tool 20 about the joining axis 46.

On the top side of the inner ring 60, an insertion taper 68 is provided in the region of the inside diameter in order to be able to insert the mouthpiece 28 more easily into the bore 66.

Figure 4:
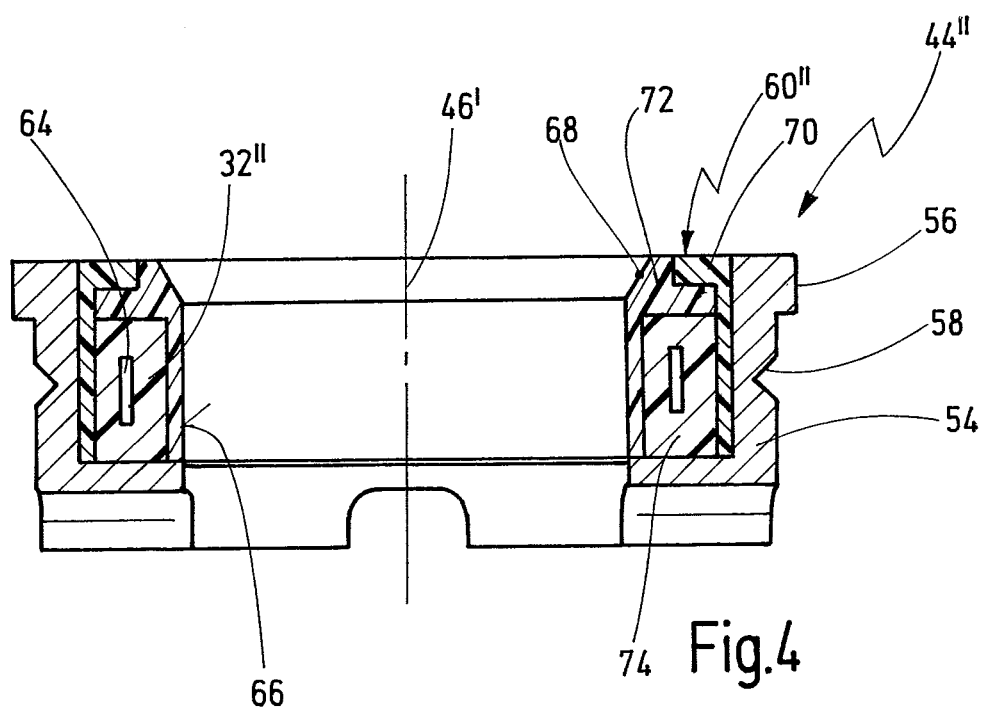
FIG. 4 shows a sectional view through a further embodiment of a bushing for a positioning device of the type shown in FIG. 2.

Shown in FIG. 4 is a further preferred embodiment of a bushing 44", which with regard to construction and functioning generally corresponds to the bushing 44' of FIG. 3. The same elements are therefore provided with the same reference numerals. The differences are essentially explained below.

It can thus be seen that the inner ring 60" of the bushing 44" is of multi-piece design, which can be advantageous from the production point of view. To be more precise, the inner ring 60" has a first ring part 70, which is arranged at the inner circumference of the outer sleeve 54, and a second ring part 72. The second ring part 72 forms, together with the first ring part 70, a casting cavity and forms with its inner circumference the bore 66. The casting cavity is filled with a casting compound 74 in which the RFID transponder is integrated, in particular cast. The coil 64 arranged rotationally symmetrically relative to the joining axis 46' permits a communication with an RFID communication device independently of the relative rotary position.

In the bushing 44", the ring parts 70, 72 are arranged in such a way that they are jointly flush with a top side of the outer sleeve 54. The casting compound 74 in this case bears against a shoulder (not designated in any more detail) of the outer sleeve 54.

The first and second ring parts 70, 72 are preferably electrically and magnetically non-conductive components and are preferably made of a plastic, for example by the injection moulding process.

Figure 5:
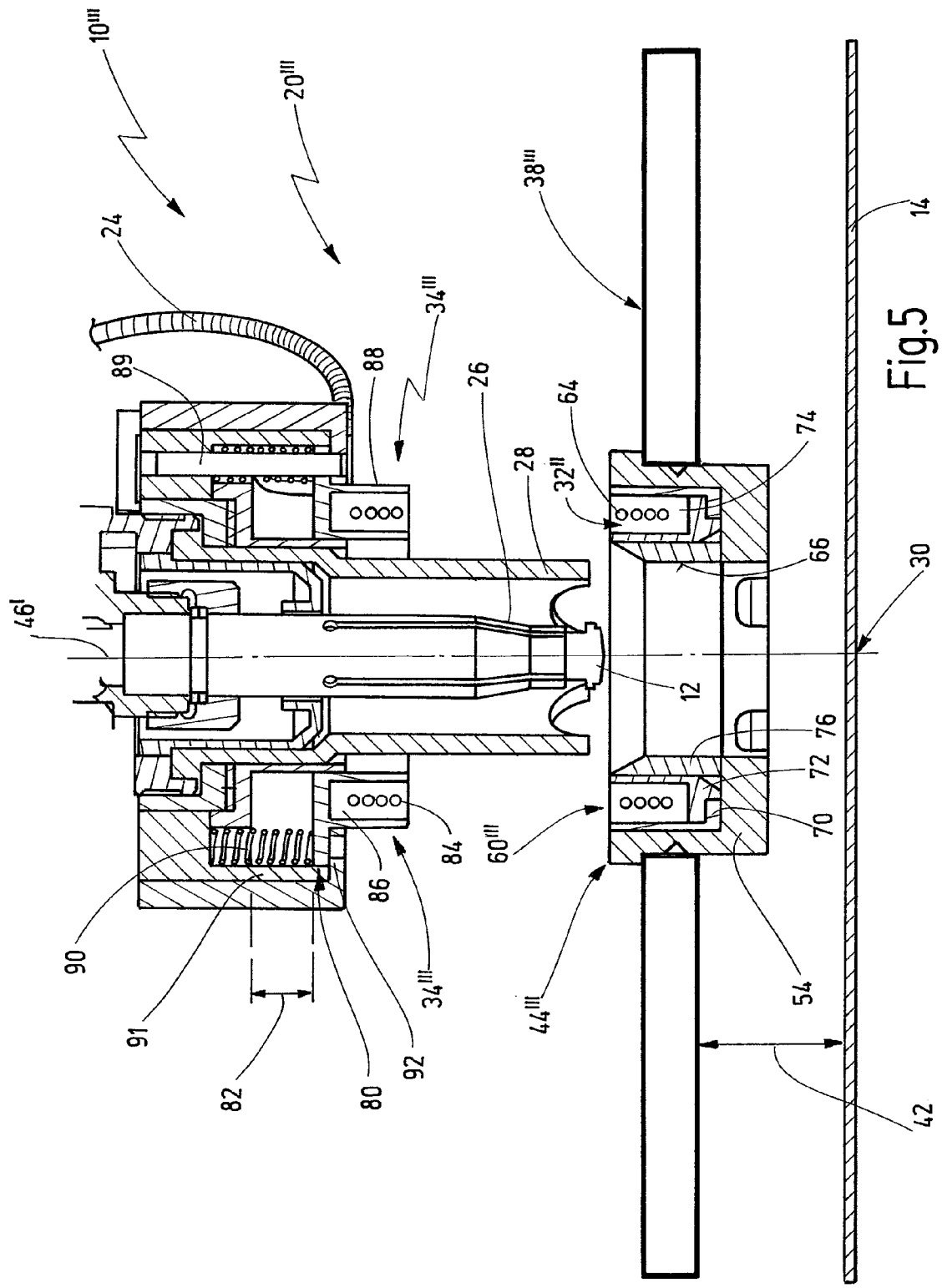
FIG. 5 shows a cross-sectional view of a joining arrangement with a further embodiment of a stud joining tool according to the invention and of a positioning device according to the invention.

FIG. 5 shows an alternative embodiment of a joining arrangement 10'''. With regard to construction and functioning, said joining arrangement 10''' generally corresponds to the joining arrangement 10 of FIG. 1. The same elements are therefore provided with the same reference numerals. The differences are essentially explained below.

Inserted into the positioning device 38''' is a bushing 44''' which, with regard to construction and functioning, generally corresponds to the bushing 44" of FIG. 4. The same elements are therefore provided with the same reference numerals. In contrast to the bushing 44" of FIG. 4, the bushing 44''' has yet a third ring part 76, which is arranged at the inner circumference of the inner ring 60'''. This third ring part encloses with the outer sleeve 54 an annular space, into which the inner ring 60''' is inserted. The third ring part 76 can in this case likewise be made of a plastic, for example by an injection moulding process, but can, if need be, also be made of a metallic material in order to increase the abrasion resistance.

In the bushing 44''', a casting cavity which is open towards the top side of the bushing 44''' is formed by the first ring part 70 and the second ring part 72. Consequently, the casting compound 74 forms part of the top side of the bushing 44'''.

In the bushings 44" and 44''' of FIGS. 4 and 5, the inner ring 60" or 60''' can be produced separately and can then be connected to the outer sleeve 54, for example by pressing, adhesive bonding or the like.

As shown in FIG. 5, a distance 42 is provided between the positioning device 38''' and a top side of the workpiece (sheet) 14. In a positioning device having a plurality of bushings, this distance 42 can vary from bushing to bushing.

In the joining tool 20 shown in FIG. 5, provision is therefore made for the RFID communication device 34''' to be mounted on the joining tool 20''' so as to be movable in a direction parallel to the joining axis 46. To be more precise, the RFID communication device 34''' is secured to a slide 80 which is axially movable relative to the mouthpiece 28 of the joining tool 20'''. The maximum stroke of the slide 80 is shown at 82 in FIG. 5.

The RFID communication device 34''' has a coil 84 as "aerial", which is arranged concentrically around the mouthpiece 28 and preferably has a diameter which is equal to the diameter of the coil 64 of the RFID transponder. When the mouthpiece 28 is inserted into the bore 66 of the bushing 44''', the RFID communication device 34''' comes into contact with the top side of the bushing 44'''. Different distances 42 from bushing to bushing can be compensated for by the axial displaceability of the slide 80.

The coil 84 is preferably likewise cast in a casting compound 86 which has been accommodated in a cavity of a sleeve component 88, which is connected to the slide 80, or is formed by the slide 80. During a movement relative to the mouthpiece 28 or the housing of the joining tool 20''', the slide 80 can be guided on the mouthpiece 28 and/or on housing parts 91, 92 and/or on one or more guide rods 89. The latter can also serve as anti-rotation locking means.

Furthermore, the slide 80, as shown, can be preloaded elastically in the joining direction by means of a spring device 90 (consisting of one or more springs). As a result, it can be ensured that the RFID communication device 34''' is also pressed onto the top side of the bushing 44''' irrespective of the distance 42 or other ambient conditions in order to minimize an air gap in between. As a result, the communication reliability can be increased. In the ideal case, the casting compounds 86, 74 bear directly against one another, such that no air gap at all is formed. Consequently, an inductive coupling between the coils 64, 84 can be realized with a lower magnetic resistance. It goes without saying that this equally applies if not only a casting compound but possibly also sections of other non-metallic or non-conductive elements, such as sections of the ring parts 70, 72 for example, are arranged between the coils 64, 84.

It will be appreciated by persons skilled in the art that the above embodiments have been described by way of example only, and not in any limitative sense, and that various alterations and modifications are possible without departure from the scope of the invention as defined by the appended claims.

What is claimed is:

1. A method for carrying out a stud joining process by a working step on a workpiece by means of a tool, and the working step is carried out while taking into account at least one parameter value which is selected from a set of values, and the working step is to be carried out at a first position on the workpiece, and the first position determines the parameter value,
wherein the method comprises the steps of:
storing the parameter value for the first position in an RFID transponder;
providing a positioning device including a plurality of positioners for defining a plurality of positions on the workpiece;
securing the RFID transponder to a first positioner on the positioning device;
locating the positioning device temporarily on the workpiece with the RFID transponder in the region of the first position before the working step is carried out; and
reading the parameter value out from the RFID transponder with an RFID communication device associated with the tool.

2. A method according to claim 1 and further comprising the step of securing the RFID transponder to a holding device before the step of locating the RFID transponder on the positioning device.

3. A method according to claim 1 and further comprising the steps of:
transmitting the read-out parameter value to a control device; and
setting the tool on the basis of the read-out parameter value.

4. A method according claim 1 and further comprising the step of providing the RFID transponder with a coil arranged concentrically around a processing axis.

5. A stud joining tool for carrying out a stud joining process by a working step on a workpiece, and the working step is carried out while taking into account at least one parameter value which is selected from a set of values, and the working step is to be carried out at a certain position on the workpiece, and the position determines the parameter value, and wherein the tool comprises:
- a stud holding device defining a processing axis;
- an RFID communication device located in a working region of the tool and operable for at least one of reading out a parameter value from an RFID transponder and for writing a parameter value into an RFID transponder, and wherein the RFID communication device is mounted on the tool so as to be movable relative to the stud holding device in a direction parallel to the processing axis.

6. A stud joining tool according to claim 5 and further comprising a control device connected to the RFID communication device and operable for setting a tool parameter according to a parameter value read-out from the RFID transponder.

7. A stud joining tool according to claim 5, wherein the RFID communication device includes a coil arranged concentrically about a processing axis in such a way that communication with the RFID transponder can be effected substantially independently of a rotary position of the tool about the processing axis.

8. A positioning device for carrying out a stud joining process by a working step on a workpiece, and the working step is carried out while taking into account at least one parameter value which is selected from a set of values, and the working step is to be carried out at a certain position on the workpiece, and the position determines the parameter value, and wherein the positioning device comprises:
- a plurality of positioners operable for defining a plurality of positions on the workpiece;
- a bushing located at a first positioner; and
- an RFID transponder located in the bushing.

9. A positioning device according to claim 8, wherein the bushing includes:
- an outer sleeve;
- an inner ring connected to the outer sleeve; and
- wherein the RFID transponder is integrated into the inner ring.

10. A positioning device according to claim 8, wherein the RFID transponder includes a coil arranged concentrically to a longitudinal axis of the bushing.

* * * * *